US008160102B2

(12) United States Patent
Cha et al.

(10) Patent No.: US 8,160,102 B2
(45) Date of Patent: Apr. 17, 2012

(54) METHOD AND APPARATUS FOR UPPER LEVEL PROTOCOL MESSAGE

(75) Inventors: Jae-Sun Cha, Daejeon (KR); Chul-Sik Yoon, Seoul (KR)

(73) Assignees: Samsung Electronics Co., Ltd., Suwon-si (KR); Electronics and Telecommunications Research Institute, Daejeon (KR); SK Telecom Co., Ltd, Seoul (KR); KT Corporation, Seongnam (KR); Hanaro Telecom, Inc., Seoul (KR)

( * ) Notice: Subject to any disclaimer, the term of this patent is extended or adjusted under 35 U.S.C. 154(b) by 139 days.

(21) Appl. No.: 12/095,427

(22) PCT Filed: Dec. 8, 2006

(86) PCT No.: PCT/KR2006/005353
§ 371 (c)(1),
(2), (4) Date: May 29, 2008

(87) PCT Pub. No.: WO2007/067012
PCT Pub. Date: Jun. 14, 2007

(65) Prior Publication Data
US 2008/0310449 A1 Dec. 18, 2008

(30) Foreign Application Priority Data
Dec. 9, 2005 (KR) .................. 10-2005-0120765

(51) Int. Cl.
*H04J 3/24* (2006.01)
(52) U.S. Cl. ........ 370/474; 370/466; 370/392; 370/389; 709/230; 709/245

(58) Field of Classification Search .................. 370/474, 370/466, 392, 389; 709/230, 245, 250
See application file for complete search history.

(56) References Cited

U.S. PATENT DOCUMENTS

| | | | | |
|---|---|---|---|---|
| 5,920,705 A | * | 7/1999 | Lyon et al. | 709/240 |
| 6,147,995 A | * | 11/2000 | Dobbins et al. | 370/392 |
| 6,675,221 B1 | * | 1/2004 | Basso et al. | 709/232 |
| 6,904,054 B1 | * | 6/2005 | Baum et al. | 370/467 |
| 7,072,337 B1 | * | 7/2006 | Arutyunov et al. | 370/389 |

(Continued)

FOREIGN PATENT DOCUMENTS
KR  10-2002-0087907 A  11/2002

(Continued)

OTHER PUBLICATIONS

Na et al., Changes on 802.16e Working Document for IP Address Allocation by Mobile IP, IEEE C802.16e-03/51, Sep. 4, 2003, pp. 0-3, IEEE.

(Continued)

*Primary Examiner* — Ricky Ngo
*Assistant Examiner* — Rasheed Gidado
(74) *Attorney, Agent, or Firm* — Jefferson IP Law, LLP

(57) ABSTRACT

Upper level protocol message transmitting method and apparatus are provided based on a new management message to be used in a portable Internet system. When a base station receives the upper level protocol message to be broadcast, it includes the same in the management message and transmits the included message to all the mobile terminals of a cell, and thus, the total number of the transmissions is decreased, thereby increasing a wireless efficiency.

7 Claims, 4 Drawing Sheets

U.S. PATENT DOCUMENTS

| | | | |
|---|---|---|---|
| 7,212,837 B1 * | 5/2007 | Calhoun et .................... | 455/560 |
| 7,466,661 B1 * | 12/2008 | Previdi et al. ................. | 370/254 |
| 7,546,358 B1 * | 6/2009 | Ochiai .......................... | 709/222 |
| 2002/0080754 A1 * | 6/2002 | Travostino et al. ........... | 370/338 |
| 2005/0038895 A1 * | 2/2005 | Mohamed et al. ............ | 709/230 |
| 2005/0183134 A1 * | 8/2005 | Lieberman et al. ........... | 725/131 |
| 2005/0265360 A1 * | 12/2005 | Kim et al. ..................... | 370/400 |
| 2006/0133413 A1 * | 6/2006 | Bousis .......................... | 370/466 |
| 2006/0168270 A1 * | 7/2006 | Townsley et al. ............. | 709/230 |
| 2007/0005803 A1 * | 1/2007 | Saifullah et al. .............. | 709/245 |

FOREIGN PATENT DOCUMENTS

| | | |
|---|---|---|
| KR | 10-2005-0107536 A | 11/2005 |
| WO | 01/89157 A2 | 11/2001 |
| WO | 2005/093998 A1 | 10/2005 |
| WO | 2005/109767 A1 | 11/2005 |

OTHER PUBLICATIONS

Bourlas et al., A Generic Packet Convergence Sublayer for Supporting Multiple Protocols over 802.16 Air Interface, IEEE C802.16e-05/283, Jun. 8, 2005, pp. 1-6, IEEE.

* cited by examiner

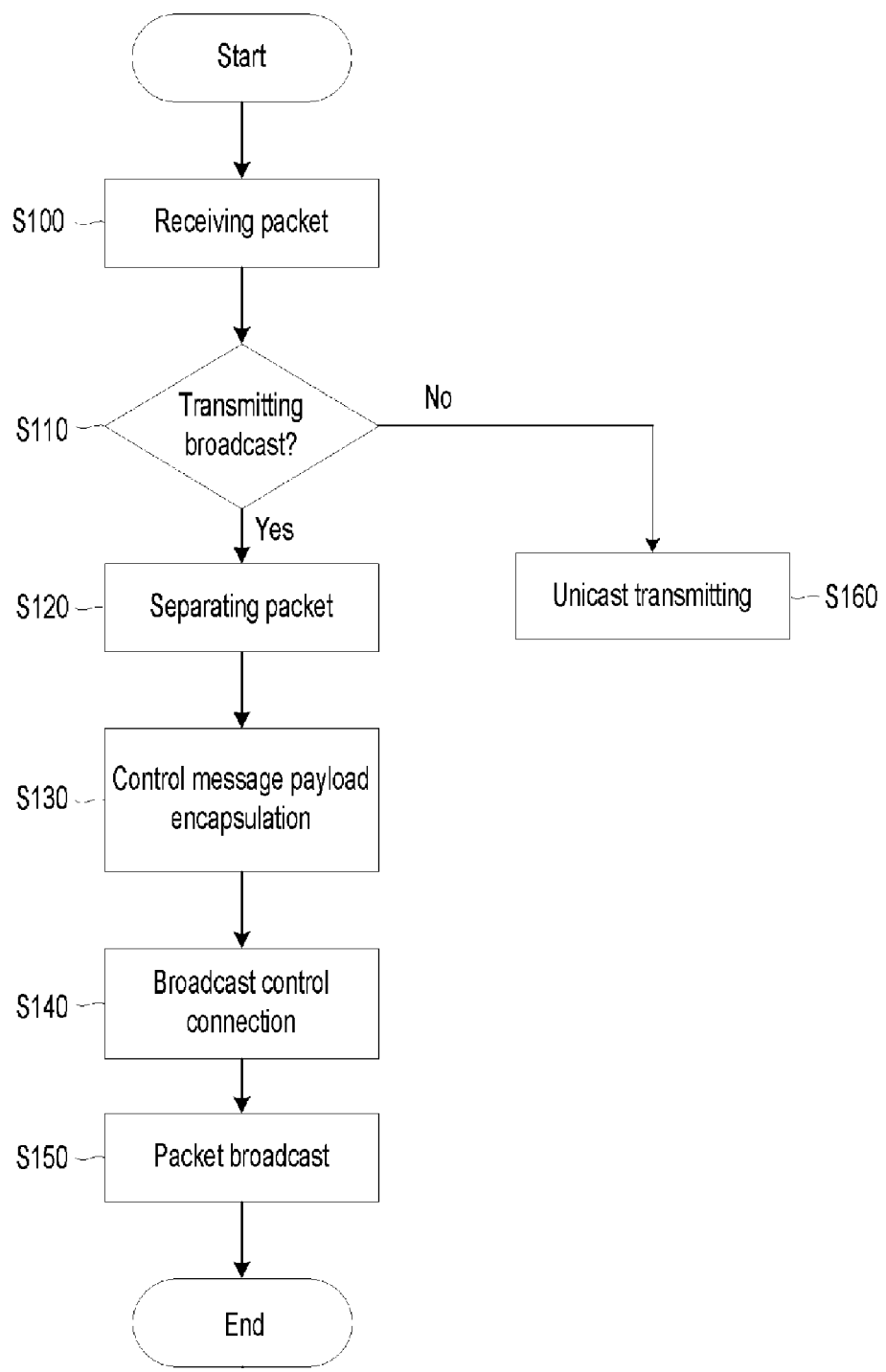
[Fig. 2]

[Fig. 3]

| Syntax | Length | Notes |
|---|---|---|
| Protocol_advertisement_Message_format(){ | | |
| Management Message Type | 8 bits | |
| TLV encoded information | variable | |
| } | | |

[Fig. 4]

| TLV Name | Type | Length | Value |
|---|---|---|---|
| Protocol Type | ?? | 1 byte | 0: IPv4(MIPv4) <br> 1: IPv6(MIPv6) <br> 2-255: reserved |
| Payload | ?? | variable | |

METHOD AND APPARATUS FOR UPPER LEVEL PROTOCOL MESSAGE

TECHNICAL FIELD

The present invention relates to a method and an apparatus for broadcasting an upper level protocol message.

BACKGROUND ART

A portable Internet system establishes a control connection and a transport connection so as to perform a communication between a mobile terminal and a base station. The control connection means a control channel for transmitting a control message so as to control a communication between the mobile terminal and the base station, and the transport channel means a connection for transmitting other user data excluding the control message transmitted through the control connection. The control message is defined for example in IEEE 802.16 standard.

Connections in the portable Internet system are identified by a connection identifier (CID). A broadcasting identifier is allocated in the control connection so that the control message to be transmitted to all mobile terminals in the cell is transmitted through the control connection appointed by the broadcasting identifier. Meanwhile, a unicast connection identifier is allocated in the transport connection so that all the user data are transmitted in a unicast manner.

Internet protocol version 6 (IPv6) or mobile internet protocol (MIP) is configured to transmit internet subnet information to the mobile terminal using a broadcast protocol message before an internet protocol address (IP address) is allocated to the mobile terminal. The internet subnet information relates to the internet subnet in which the mobile terminal is included. However, since the conventional portable Internet system, for example, IEEE 802.16 Wireless Metropolitan Area Network (MAN)-based portable Internet system, is configured such that a transmission of an upper layer protocol message, such as the IPv6 or the MIP, is performed through the transport connection, the portable Internet system may not broadcast the upper layer protocol message.

Accordingly, in the portable Internet system, the broadcasting can be performed between the base station and the backbone network, but the protocol message is transmitted in the unicast manner between the mobile terminal and the base station. As described above, the protocol message which can be transmitted at one time must be transmitted in the unicast manner to each of the mobile terminals included in the cell, and accordingly, there is a drawback that wireless transmission efficiency is deteriorated.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a broadcasting method and apparatus having the advantage of increasing wireless efficiency by broadcasting a control message including a upper level protocol message to be broadcast to a mobile terminal.

Technical Solution

An exemplary embodiment of the present invention provides a method for broadcasting a protocol message to a terminal. The broadcasting method includes: separating a packet including a protocol message to be broadcast from received packets; encapsulating the separated packet in a payload of a control message; setting a protocol type value of the control message according to a protocol type of the protocol message; and broadcasting the control message through a broadcasting control connection based on the protocol type value.

Another embodiment of the present invention provides an apparatus for broadcasting a protocol message provided from a backbone network to a terminal in a base station. The apparatus includes a header-type analyzing unit, a packet separating unit, an encapsulation-performing unit, a protocol type establishing unit, and a transmitting unit. The header-type analyzing unit analyzes protocol field information included in a header of each of received packets and checks whether each of the received packet is a protocol message to be broadcast. The packet separating unit separates a packet to be broadcast from the received packets based on an analyzing result of the header-type analyzing unit. The encapsulation-performing unit encapsulates the separated packet in a payload of a control message, and the protocol type establishing unit establishes a protocol type value for a broadcasting connection of the control message. The transmitting unit broadcasts the control message though the dedicated broadcasting connection connected based on the protocol type value established in the protocol type establishing unit.

Yet another embodiment of the present invention provides a recording medium having a recorded control message for transmitting a protocol message through a broadcasting control connection. The control message includes a protocol type in which information corresponding to the protocol type of the protocol message is stored in the format of Type, Length, and Value, and a payload in which data of the protocol message is encapsulated.

ADVANTAGEOUS EFFECTS

According to the exemplary embodiments of the present invention, the portable Internet system may easily utilize a protocol such as Internet protocol version 6 or mobile Internet protocol version 6.

When the base station receives an upper level protocol message to be broadcast, the upper level protocol message is included in the control message, the included message is broadcast to all the mobile terminals in the cell, and accordingly, a total transmission number is decreased, thereby increasing a wireless efficiency.

BRIEF DESCRIPTION OF THE DRAWINGS

FIG. 2 is a schematic flowchart showing a method for broadcasting an upper level protocol message according to a second exemplary embodiment of the present invention.

FIG. 3 and FIG. 4 schematically illustrate a control message format according to a third exemplary embodiment of the present invention.

BEST MODE FOR CARRYING OUT THE INVENTION

Figure 1:
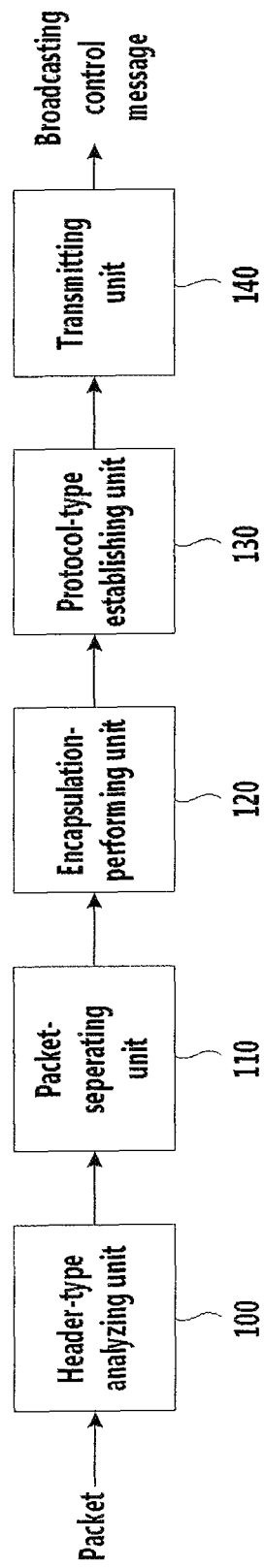
FIG. 1 is a schematic block diagram of an upper level protocol message broadcasting apparatus according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element. Each block means a unit for processing an appointed function or operation, and may be realized in hardware, software, or in a combination of software and hardware.

FIG. 1 is a schematic block diagram of an upper layer protocol message broadcasting apparatus according to a first exemplary embodiment of the present invention.

Referring to FIG. 1, the upper layer protocol message broadcasting apparatus includes a header-type analyzing unit 100, a packet-separating unit 110, an encapsulation-performing unit 120, a protocol-type establishing unit 130, and a transmitting unit 140.

The header-type analyzing unit 100 identifies that a received packet is a general user data or it is an upper level protocol message to be broadcast. That is, the header-type analyzing unit 100 analyzes protocol field information included in an internet protocol (IP) header of the received packet and a header-type of a second-upper level protocol included in an IP payload of the received packet so as to identify the message. According to the first exemplary embodiment of the present invention, since the protocol type includes internet protocol version 4 (or mobile internet protocol version 4) and internet protocol version 6 (or mobile internet protocol version 6), the header-type analyzing unit 100 analyzes protocol field information included in an IP header, but is not limited thereto.

The packet-separating unit 110 separates the corresponding packet when the received packet is the upper level protocol message to be broadcast such that the corresponding packet is not transmitted through the unicast transport connection.

The encapsulation-performing unit 120 encapsulates the entire packet separated by the packet-separating unit 110 in a payload of a control message. The protocol-type establishing unit 130 establishes a value of a protocol type of the control message after the packet is encapsulated in the payload of the control message. The transmitting unit 140 broadcasts the control message through a broadcasting connection connected based on the established value of the protocol-type establishing unit 130.

Hereinafter, a method for broadcasting a message in the broadcasting apparatus of FIG. 1 will be described in detail with reference to FIG. 2.

FIG. 2 is a flowchart showing a method for broadcasting an upper level protocol message according to a second exemplary embodiment of the present invention.

Referring to FIG. 2, the base station receives a data packet from the backbone network in step S100, and checks whether to broadcast the received data packet in step S110, by identifying that the received packet is general user data or is the upper level protocol message to be broadcast. The base station analyzes protocol field information included in an IP header of the data packet and a header-type of a second-upper protocol included in an IP payload of the data packet so as to identify the message.

When the base station determines the data packet as the protocol message to be broadcast, such as a router advertisement of the mobile Internet protocol version 6, by analyzing the protocol field information and the header-type, the base station separates the data packet in step S120 such that the data packet is not transmitted through the unicast transport connection. When the data packet is general user data, the base station transmits the data packet in the unicast manner in step S160.

When the data packet is determined as the upper level protocol message to be broadcast, the base station encapsulates the separated data packet in a payload of the control message in step S130. In one embodiment, the data packet may be encapsulated in the payload of the control message in a Type/Length/Value (TLV) scheme. And then, the base station establishes a value of a protocol type of the control message in which the data packet is encapsulated based on the protocol field information analyzed in the step S110. In one embodiment, the analyzed protocol field information is established in the protocol type field of the control message in the TLV scheme, and accordingly, the protocol type value is established.

When the control message for broadcasting is configured, the base station establishes a broadcasting control connection that the protocol type, that is, a broadcasting connection identifier, appoints in step S140, and broadcasts the control message through the broadcasting control connection to the mobile terminal in step S150.

The upper level protocol message is broadcast on the portable Internet in this flow. A format of the control message used for broadcasting will be described with reference to FIG. 3 and FIG. 4.

FIG. 3 and FIG. 4 schematically illustrate a control message format according to a third exemplary embodiment of the present invention.

The TLV scheme according to the third exemplary embodiment of the present invention is designed to use a variable length-message. For example, a TLV scheme defined in the IEEE 802.16 standard may be used in the present invention.

In detail, according to the IEEE 802.16 standard, the message includes a fixed field parameter and a TLV parameter. The fixed field parameter means that the location and length of the parameter is predetermined in the message. The TLV parameter is expressed using three parameters Type, Length, and Value, and means that Type and Length are previously defined, but location of the message is not fixed. The message format may be encoded in order of Type, Length, and Value consecutive to the fixed parameter.

As shown in FIG. 3, the control message includes management message type information and TLV-type encoded information. The management message type information may have, for example, 8-bit length, and the TLV-type encoded information may have a variable length. As shown in FIG. 4, the TLV-type encoded information includes a protocol type and a payload.

According to the third exemplary embodiment of the present invention, the TLV-defined protocol type and payload are used as a TLV parameter, and Type and Length of the protocol type and payload are defined. However, since Type must not collide with the Type used in the given standard, it may not be defined.

In the control message, the protocol type is encoded in order of Type ??, Length 0x01, and Value 0x01 or 0x02, and also the payload is encoded in the same order. The decoding block compares the first byte value consecutive to the last fixed field parameter (management message type) of the message to the defined TLV type, and determines whether the first byte value is a protocol type or a payload.

For example, when the first byte value is the same as the TLV-type allocated to the protocol type, the mobile terminal reads a value 0x01 of Length stored at the next byte and decodes Value by the length thereof. The payload may be decoded in the same manner.

In such an order, the decoding block acquires Value viewing Type and Length and repeats an operating acquiring Value by the end of the control message.

According to the exemplary embodiments of the present invention, the portable Internet system may easily utilize a protocol such as Internet protocol version 6 or mobile Internet protocol version 6.

The invention claimed is:

1. A method for broadcasting a protocol message to at least two terminals, the method comprising:
   analyzing protocol field information included in a header of each of the received packets and a header type of an upper level protocol message included in a payload of each of the received packets;
   separating, by a network entity, a packet from packets received by the network entity, the separated packet including a protocol message to be broadcast by the network entity;
   encapsulating, by the network entity, the separated packet in a payload of a control message;
   setting, by the network entity, a protocol type value of the control message according to a protocol type of the protocol message; and
   broadcasting, by the network entity, the control message through a broadcasting control connection based on the protocol type value.

2. The method of claim 1, wherein the encapsulating includes:
   encapsulating the separated packet in the payload of the control message when the separated packet is desired to be broadcast.

3. The method of claim 2, wherein the separated packet is encapsulated in the payload of the control message using a Type/Length/Value (TLV) scheme.

4. The method of claim 3, wherein the protocol Field information is stored at a field for establishing the protocol type value of the control message as a TLV format such that the protocol type value is established.

5. An apparatus for broadcasting a protocol message provided from a backbone network to a terminal in a base station, the apparatus comprising:
   a header-type analyzing unit for analyzing protocol field information included in a header of each of received packets and checking whether each of the received packets is a protocol message to be broadcast;
   a packet separating unit for separating, from the received packets, a packet to be broadcast, based on an analyzing result of the header-type analyzing unit;
   an encapsulation-performing unit for encapsulating the separated packet in a payload of a control message;
   a protocol type establishing unit for establishing a protocol type value for a broadcasting connection of the control message; and
   a transmitting unit for broadcasting the control message through the dedicated broadcasting connection connected based on the protocol type value established in the protocol type establishing unit.

6. The apparatus of claim 5, wherein the control message includes a protocol type and a payload.

7. The broadcasting apparatus of claim 6, wherein the protocol type and payload are encoded using a TLV scheme.

* * * * *